July 19, 1938.  E. C. R. WEISGERBER  2,124,359
STOPCOCK
Filed July 8, 1935
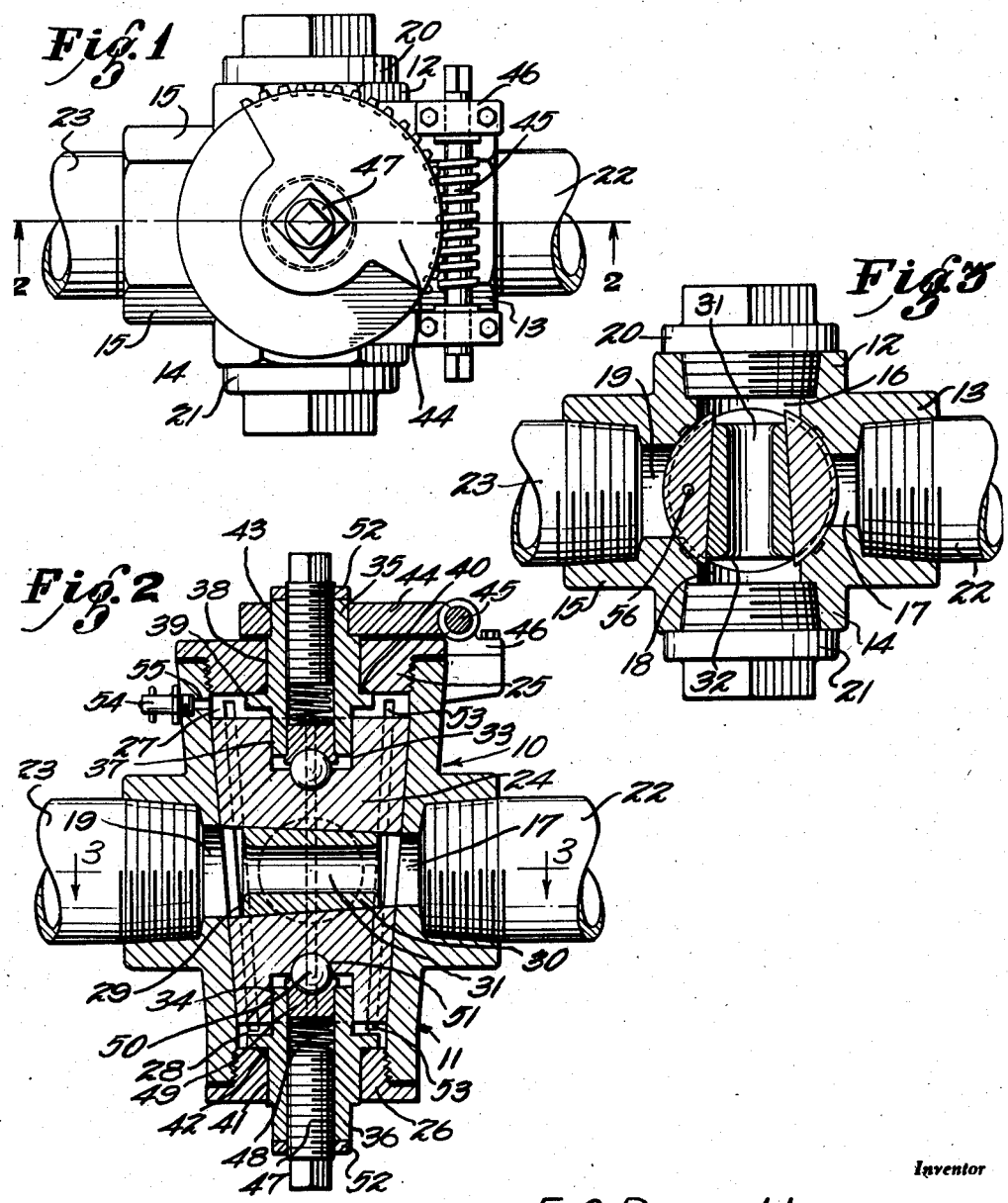
Inventor
E. C. RUDOLF WEISGERBER
By James M. Abbett
Attorney Patented July 19, 1938

2,124,359

UNITED STATES PATENT OFFICE 2,124,359

STOPCOCK

Edwin C. Rudolf Weisgerber, Los Angeles, Calif., assignor to J. R. Pemberton, Los Angeles, Calif.

Application July 8, 1935, Serial No. 30,266

3 Claims. (Cl. 251—112)

This invention relates to valves, and particularly pertains to a stop cock.

In connection with the control of flow of various fluids and particularly those operating under excessive pressure, it is desirable to provide a valve which may be readily operated against the pressure fluid; which is not liable to become stuck, and which may be easily moved to a full opened or full closed position. It is the principal object of the present invention, therefore, to provide a valve adapted to be interposed in a line of flow of fluids, especially those under pressure, and which valve is of the stop cock type having means for insuring that the valve element may be operated easily from either of its ends to be moved to a full opened, or full closed position; that it will not stick within the valve housing, although it will form a tight seal for fluids without the use of packing or packing glands. It is a further object of the invention to provide a valve adapted readily to receive flow nipples by which the flow capacity of the valve may be easily changed to suit conditions under which it has been installed.

The present invention contemplates the provision of a valve body through which a valve plug extends and by which the flow of fluid through the valve body may be controlled or interrupted, the valve plug being mounted in a full floating suspension whereby it will readily find its seat and may be moved therefrom or rotated by operation at either end of the valve body.

The invention is illustrated by way of example in the accompanying drawing, in which:

Fig. 1 is a view in elevation showing the gear operated end of the valve as assembled.

Fig. 2 is a view in central section through the valve as seen on the line 2—2 of Fig. 1, and discloses the valve construction, the mounting for the plug, and operating means therefor.

Fig. 3 is a view in transverse section through the valve structure as seen on the line 3—3 of Fig. 2 and discloses the valve body equipped for two-way operation, and with the valve plug in its closed position.

Referring more particularly to the drawing, 10 indicates a valve body. The valve body is here shown as including a tubular valve seat 11 from the sides of which bosses 12, 13, 14, and 15 extend. Said bosses are shown in Fig. 3 as lying in a common plane and disposed at right angles to each other and radial of the rotating axis of the valve. By this arrangement it is possible to establish direct flow of fluid across the valve body in paths at right angles to each other. The valve boss 12 encloses a port 16. The valve boss 13 encloses a port 17, while the bosses 14 and 15 enclose ports 18 and 19, respectively. As shown in Fig. 3, the ports 16 and 18 are closed by plugs 20 and 21, while the ports 17 and 19 are in communication with flow pipes 22 and 23, respectively. This makes a single pass valve, although the removal of plugs 20 and 21 and the attachment of suitable conduits would produce a two pass valve. Rotatably mounted within the valve seat 11 and extending with its longitudinal axis in a plane at right angles to the plane of the fluid connections is a valve plug 25. This plug is frusto-conical in formation and seats within a correspondingly tapered seat within the valve seat 11. The enlarged end of the valve seat structure 11 is closed by a top cap 25, which is threaded into the mouth of the valve seat bore, the opposite end of the valve seat being closed by a bottom cap 26 threaded into the mouth of the smaller end of the valve seat bore. Attention is directed to the fact that both of these caps have extensions projecting into the valve seat bore, but that these extensions do not project to abutting positions with relation to the opposite ends of the valve plug 25, but allow spaces 27 and 28 to occur at the ends of the valve plug 24 for purposes which will be hereinafter set forth. Extending transversely of the longitudinal axis of the valve plug 24 and with its center intersecting said axis is a valve opening 29 which may be moved to register with the ports 17 and 19 to establish communication between pipes 22 and 23. The valve opening 29 is preferably tapered longitudinally and since Fig. 2 of the drawing shows that the diameter of the bore 19 is larger than the diameter of the bore 17, it will be understood that the valve passageway 29 is of the diameter of bore 19 at one end and is of the diameter of the bore 17 at the opposite end. This serves the purpose of restricting the flow area toward the discharge side of the valve and also provides a seat for a flow nipple 30 which may be inserted removably within the passageway 29 and is formed with a central restricted opening 31 by which a desired amount of restriction in the pipe line may be brought about. Attention is directed to the fact that the passageway 31 of the flow nipple 30 is of uniform sectional area throughout its length and that its opposite ends are relieved and curved outwardly as indicated at 32. This insures that there will not be a violent disturbance of the fluid passing into the flow nipple or being discharged therefrom and that objectionable eddy currents will thus be prevented from forming in the flowing fluids. The opposite ends of the valve plug 24 are formed with square counterbores 33 and 34. These counterbores are intended to receive the projecting ends of valve keys 35 and 36. The valve keys have squared end portions 37 which fit within the counterbores 33 and 34, and intermediate cylindrical portions 38 which are mounted to rotate within central bearing openings formed in the end caps 25 and 26. Shoulders 39 are formed around the keys 35 and 36 at a point between the squared portions 37 and the cylindrical portions 38 of each key and abut against the inner faces of the caps 25 and 26 to limit the outward movement of the keys and to permit their rotation within the caps. Interposed between each of the shoulders and the contiguous end faces of the cap is an annular metal packing ring 40 preferably formed of copper or other suitable ductile metal. The inner ends of the bearing openings 41 within which the portions 38 of the keys rotate are slightly relieved, as indicated at 42, to permit a tight fit between the parts. The outer ends of each of the keys 35 and 36 terminate in portions of squared section, as designated at 43, and by which the keys 35 and 36 may be rotated. This may be accomplished manually by the application of a wrench, as would be possible in connection with the keys 36, or may be done mechanically by the use of a gear segment 44, as shown mounted upon the outer square portion 43 of the keys 35. This gear is here shown as being a segment of a worm wheel which is in mesh with a worm gear 45 rotatably mounted in suitable bearings 46 upon the body of the valve and adapted to be turned by a wrench or other means which would engage the square end thereof. By this arrangement it would be evident that a very minute and accurate adjustment of the valve can be obtained and that the valve can be operated against excess fluid pressure. The keys 35 and 36 are shown in Fig. 2 of the drawing as being tubular and serve as a mounting for adjustor screws 47 which are threaded into the keys and bear against springs 48 at their inner ends. These springs in turn exert pressure against longitudinally slidable ball seats 49 in the outer faces of which a recess is formed to receive a ball 50. The balls 50 fit into recesses 51 formed in the end walls of the square counterbores 33 and 34 of the valve plug 24. Attention is directed to the fact that the ball plugs are formed at their inner ends with shoulders which limit their upward movement through the keys 35 and 36. By this arrangement it will be seen that pressure limiting end movement of the valve plug 24 in either direction is exerted against the balls 50, and that by adjustment of the adjusting screws 47 in either direction it is possible to vary the tension imposed upon the valve springs and to thereby yieldably urge the valve plug 24 toward a tight fit in the direction of the taper or yieldably urge the valve plug from a tight position in a direction opposite to the taper. It is preferable that the spring 48 within the key 35 shall exert the greatest pressure of the two to thereby maintain the valve against its seat. The adjusting screws 47 are held in set position by lock nuts 52. It is desirable that the valve plug 24 shall be free to rotate at all times and that it will not stick in its seat. In order to prevent this a plurality of longitudinally extending ducts 53 are cut in the inner face of the valve seat. These ducts are of a length to extend beyond the opposite ends of the valve plug 24 and will thus communicate with the end spaces 27 and 28 occurring between the ends of the valve plug and the caps 25 and 26. A nipple 54 is mounted in communication with a duct 55 through the wall of the valve seat so that lubricant under pressure may be forced into the space 27 and then along the various lubricating ducts 53 to the space 28 at the opposite end of the valve. In this manner the valve will at all times be packed in a suitable lubricant. In order to prevent an overfeeding of the lubricant in a manner to cause the valve plug 24 to be bound, a return duct 56 is formed lengthwise of the valve plug 24, as indicated particularly in Fig. 3 of the drawing. This will insure that the pressure of the lubricant will be equalized at both ends of the valve plug 24 and that the valve will in effect be suspended between the two springs 48 of the valve keys 35 and 36.

In operation of the present invention the valve is assembled as shown in Fig. 2 of the drawing. It will be understood that while the valve body is disclosed in Fig. 3 of the drawing as having the two sets of outlet ports 16 and 18, and 17 and 19, respectively, that the valve body may be made if desired without the ports 16 and 18 and the accompanying bosses. Assuming, therefore, that operation of the valve is required to control the flow of fluid through the pipes 22 and 23, it will be evident that the fluid may flow in either direction through these pipes if desired when the valve plug 24 is rotated to bring the valve passageway 29 into register with the ports 17 and 19. The valve may be rotated through the medium of the worm gear 45 or the worm wheel 44 if desired, or the gear structure may be eliminated so that either of the keys 25 and 26 may be rotated by providing a valve wrench or suitable handle for the key. The valve may be lubricated at any time by forcing a lubricant through the nipple 54.

In the event that the valve should stick, or that it is desired to adjust the valve element with relation to its seat, this may be readily done by operation of the screws 47, which will act through springs 48 to exert the desired pressure at either end of the valve element 24 to thereby adjustably set the valve with relation to its seat and to support it in a semi-floating condition as controlled by the relative tension of the two springs 48.

As before stated, the springs 48 at opposite ends of the valve member are of unequal tension, with the spring 48 adjacent the large end of the valve exerting a greater force than the supplemental spring at the small end of the valve. By this arrangement the valve will always be yieldably held upon its seat. This will not only tend to preclude the possibility that the valve will stick under normal pressures and temperatures, but also insures that in the event the valve structure becomes excessively heated the valve may readily move from its seat without becoming bound due to relative expansion and contraction of the valve parts, thus insuring that under all conditions of pressure and temperature the valve may be operated with ease.

It will thus be seen that by the construction here disclosed a valve is provided which may be made out of any type of metal required to properly combat the action of fluids to be controlled by the valve, and that under any circumstances the valve, while firmly set, may be easily moved to desired adjusted positions and may be readily set so that it will operate against excessive pressures. It will also be evident that by the introduction of the flow nipples into the passageway through the valve element that the capacity of the valve may be instantly changed for any particular purpose.

While I have shown the preferred form of my invention, as now known to me, it will be understood that various changes may be made in combination, construction, and arrangement of parts by those skilled in the art without departing from the spirit of my invention as claimed.

Having thus described my invention, what I claim and desire to secure by Letters Patent is:

1. A control valve of the stop cock type which includes a valve housing having a tapered valve seat, a tapered valve member rotatably disposed within said housing and upon said seat, valve ports from the side wall of the housing and a valve passageway from the valve member and adapted to be rotated to register with the ports, squared recesses formed in the opposite ends of the member, means closing the opposite ends of the valve housing, means extending through the closures and into the valve recesses in the opposite ends of the valve member to rotate the same, the valve member being longitudinally movable with relation to said rotating means, and yieldable means interposed within the recesses and between said rotating means and the valve member for yieldably resisting longitudinal movement of the valve member with relation to the rotating means in either direction, and adjusting means for controlling the degree of yieldability of said yielding means.

2. A control valve of the stop cock type which includes a valve housing having a tapered valve seat, a tapered valve member rotatably disposed within said housing and upon said seat, valve ports through the side wall of the valve housing the valve having a passageway to register with said ports, closures for opposite ends of the valve housing, said closures providing a clearance space between said closures and the end of said valve member, said valve member being formed with a squared counterbore in each end, keys mounted within the counterbores said keys being formed with a threaded center bore, an adjusting screw therein, a ball seat which is formed with a ball recess and slidably mounted within the opposite end of the key bore, a ball seated in said recess, the end of said valve member being formed with a recess within which said ball also seats, and a spring within the center bore of each key and between the adjusting screw therefor and complementary ball seat.

3. A control valve of the stop cock type which includes a valve housing having a tapered valve seat, a tapered valve member rotatably disposed within said housing and upon said seat, valve ports from the side wall of the housing and a valve passageway from the valve member adapted to be rotated to register with the ports, means closing the opposite ends of the valve housing, means extending through said closures and into squared recesses formed at opposite ends of the valve member, said means adapted to rotate the valve member, the valve member being longitudinally movable with relation to said rotating means, and yieldable means interposed within the recesses and between said rotating means and the valve member for yieldably resisting longitudinal movement of the valve member in either direction with relation to the rotating means, and adjusting means for controlling the yieldability of said yielding means, a clearance formed between the closures for the opposite ends of the valve housing and the valve member, longitudinal grooves formed in the faces of the valve seat to provide communication between said clearance spaces and means for supplying lubricant under pressure to said end spaces and longitudinal grooves whereby the lubricant will be equalized between the two clearance spaces by means of the longitudinally extending grooves.

E. C. RUDOLF WEISGERBER.